Jan. 19, 1971  H. P. SORELL  3,556,835
REPULPABLE TAPE
Filed Sept. 3, 1968
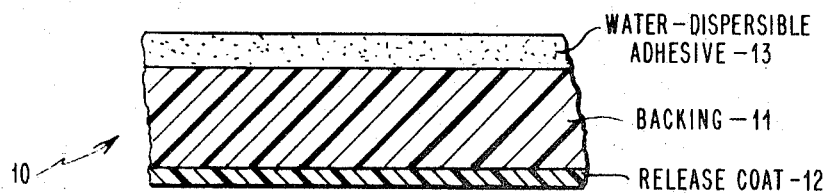
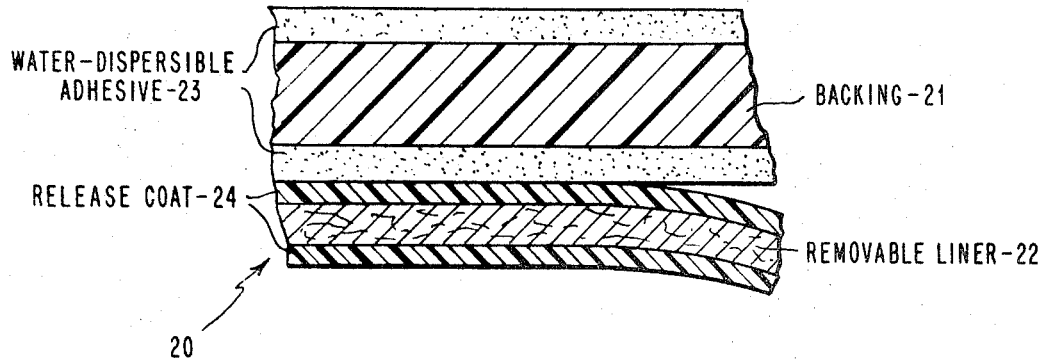
HENRY PAUL SORELL
INVENTOR.
BY John L. Sigalos
ATTORNEY 3,556,835
REPULPABLE TAPE
Henry Paul Sorell, Mount Prospect, Ill., assignor to Borden, Inc., New York, N.Y., a corporation of New Jersey
Filed Sept. 3, 1968, Ser. No. 756,752
Int. Cl. C09j 7/04
U.S. Cl. 117—68.5                              8 Claims

ABSTRACT OF THE DISCLOSURE

This invention relates to repulpable tapes particularly suited for splicing paper webs comprising a water-dispersible backing having applied to at least one surface thereof a water-dispersible pressure-sensitive adhesive consisting essentially of a polyvinyl methylether, a $C_1$–$C_4$ alkyl half ester of a vinyl methyl ether and maleic anhydride copolymer, and a hydantoinformaldehyde resin.

BACKGROUND OF THE INVENTION

U.S. Pats. Nos. 2,838,421 and 3,152,940 disclose water-dispersible adhesives and adhesive tapes (repulpable tapes) that are useful in the preparation of paper webs. In such use both the adhesive and tape must be at least dispersible and preferably soluble in water under alkaline, acid, or neutral conditions. It is also required that the adhesive be sufficiently tacky to adhere promptly to the paper web and have sufficient cohesive strength.

While the tapes disclosed in the cited patents are generally suitable they fail to provide the rapid water-dispersibility required in both hot and cold water coupled with tackiness and cohesive strength of the pressure-sensitive adhesive portion of the tape.

SUMMARY OF THE INVENTION

A repulpable tape has now been found in which the backing and adhesive are rapidly dispersible in both hot and cold water and in which the adhesive layer has the tack and cohesive strength required to function without failing in the splicing of paper webs.

The present invention is directed to a repulpable tape comprising a water-dispersible backing and a water-dispersible pressure sensitive adhesive applied to at least one surface thereof consisting essentially of a polyvinyl methyl ether, a $C_1$–$C_4$ alkyl half ester of a vinyl methyl ether and maleic anhydride copolymer, and a hydantoin- formaldehyde resin.

BRIEF DESCRIPTION OF THE DRAWINGS

Illustrative adhesive tapes are shown in the accompanying drawing wherein:

FIG. 1 is a schematic sectional embodiment of a single-face tape: and

FIG. 2 is a schematic sectional embodiment of a double-face tape.

DETAILED DESCRIPTION OF THE INVENTION

Referring to FIGS. 1 and 2 there are shown water-dispersible pressure sensitive adhesive tapes 10 and 20 comprising water-dispersible backings 11 and 21 coated on one side in the case of tape 10 and both sides as to tape 20 with water-dispersible adhesives 13 and 23 of the present invention. The tape 10 is provided with a water-dispersible release coat 12 to permit winding into and unwinding from rolls which is the usual manner in which such tapes are commercially sold and the tape 20 is provided with a removable liner 22 having a release coat 24 for this same purpose.

As to materials, the adhesive must be a combination of a polyvinyl methyl ether, a $C_1$–$C_4$ alkyl half ester of a vinyl methyl ether-maleic anhydride copolymer, and a hydantoin formaldehyde resin. The polyvinyl methyl ether must comprise at least about 50 parts by weight of the adhesive and the half ester of the PVM/MA copolymer preferred is the methyl ester.

The polyvinyl methyl ether used can be any one of the readily available polymers of varying molecular weight, provided, however, that they are water-soluble and have a viscosity that makes them tacky.

As to the half ester of polyvinyl methyl ether-maleic anhydride, the molecular weight may also vary as from about 3,000 to about 5,000. While ethyl, propyl, and butyl esters can be used it is preferred to use the methyl ester. Particularly suitable is the half ester of the 50/50 copolymer of polyvinyl methyl ether and maleic anhydride.

The hydantoin formaldehyde resin used is preferably dimethyl hydantoin formaldehyde, although methyl ethyl hydantoin formaldehyde and the like resins can also be used.

The adhesive is formed by simply mixing the three essential components together to form a substantially homogeneous mixture and applied to the backing in the usual manner.

The backing to which the adhesive is applied can be any water-soluble or water-dispersible film, tissue, or raw paper. Suitable films are polyvinyl alcohol, alkoxylated polyvinyl alcohol, methyl cellulose and high molecular weight polyethylene oxide films. The tissues that can be used can be any cellulosic or synthetic filler material which is unified with water-dispersible impregnants that are standard in this art. The raw paper used can be any stock, such as rope stock, which is unified with a water-dispersible impregnant.

While the adhesive of the instant invention is suitable with the three essential components, increased tack can be obtained by including a tackifier resin suitably an alkylphenoxyethylene oxide condensation product such as the commercially available IGEPAL products. Preferred is octyl-phenoxy polyethoxyethanol. Also suitable are the high molecular weight diols, such as polyethylene glycol, polypropylene glycol, and other hydroxy polylalkylene elasticizer compounds set forth in U.S. Pat. No. 2.838,421. Amount of the tackifier resin may be up to 20 parts by weight based on 100 parts of the adhesive.

If desired, a curing agent can be used, particularly of a Werner type chromium complex such as a stearato chromic chloride to act to cross-link the polymers to give increased heat resistance.

It is also most suitable to add one of the usual antioxidants for polyvinyl methyl ether such as an organic phosphite such as an alkylated aryl phosphite or an alkylphenol.

For ease of application of the adhesive to the backing, and to adjust the solids content of the adhesive, solvents for the adhesive are used, such as isopropanol and toluol.

Where the tape is coated on both sides with adhesive (FIG. 2) a removable liner is provided which is coated with standard release agents so the liner can be easily removed when the tape is unwound for use.

As to proportions, the polyvinyl methyl ether must comprise at least 50 parts by weight for each 100 parts by weight of the adhesive. Amounts of polyvinyl methyl ether above about 90 or 92 parts are not suitable and if a tackifier resin is included it is preferred not to use more than about 80 parts by weight. The PVM/MA half ester is preferably added in the ratio of about 0.2 part for each part by weight of polyvinyl methyl ether and ratios of from about 0.1 to about 0.5 part are also utilizable. The hydantoin formaldehyde resin is used in the proportion of about 0.05 to about 0.2 part by weight, and preferably 0.1 part, for each part by weight of polyvinyl methyl ether. Where other materials such as the tackifying resin referred to previously are incorporated in the adhesive, care should be taken to insure that the three essential components of the adhesive provide at least about 80 parts by weight for each 100 parts by weight of adhesive.

The invention will be further illustrated by description in connection with the following specific examples of the practice of it. Proportions are in parts by weight unless stated otherwise.

EXAMPLE 1

A pressure-sensitive adhesive was prepared by admixing the following ingredients:

| | Parts by weight |
|---|---|
| Polyvinyl methyl ether | 66.0 |
| Methyl half ester PVM/MA | 10.85 |
| Dimethyl hydantoin formaldehyde | 6.96 |
| Octyl-phenoxy polyethoxyethanol | 15.9 |
| Antioxidant | .24 |
| Stearato chromic chloride | .05 |
| Total | 100.00 |

A mixture of isopropanol and toluol were used to adjust the solids content of the adhesive to 35%.

EXAMPLE 2

The adhesive of Example 1 was used to prepare the following repulpable tapes:

(A) A single faced hot water soluble tape was prepared by coating a plasticized polyvinyl alcohol film on one side with the adhesive of Example 1 at 27 lbs./ream. The other side of the tape was coated with a release coat (polyvinyl octadecyl carbonate).

(B) A double faced cold and hot water soluble tape was made by coating a polyvinyl alcohol film on both sides with the adhesive of Example 1 at 15 lbs./ream. A removable liner coated on both sides with a release coat was applied to one side of the coated film.

(C) A double faced high tensile strength tape was prepared as in (B) above except that rope stock impregnated with a water-dispersible rubbery polymer was used in place of the polyvinyl alcohol film.

All three tapes were rapidly water dispersible and when used to splice a paper tape had the tack and cohesive strength required even when the web was exposed to high temperatures (about 400° F.).

EXAMPLE 3

A single faced paper tape is made by saturating 1.5 to 2 mil unsaturated rope stock with the adhesive of claim 1 at a viscosity of about 1400 cps. The pick up is about 25 to 30%.

A base release coat consisting of a 5% solution of low molecular weight polyvinyl alcohol is applied at the rate of about 3 to about 6 lbs./ream to the back side of the tape.

35 lbs./ream of the adhesive of claim 1 is then applied to the front of the tape and a very thin layer of polyvinyl octadecyl carbonate as the release coat is applied over the base release coat.

The resultant tape is repulpable and when wound for use into roll form does not freeze.

EXAMPLES 4–6

A series of pressure sensitive adhesives was prepared by admixing the following ingredients:

| | Parts by weight | | |
|---|---|---|---|
| Example | 4 | 5 | 6 |
| Polyvinyl methyl ether | 79.7 | 66.0 | 50.0 |
| Methyl half ester PVM/MA | 13.0 | | 25.0 |
| Isopropyl half ester PVM/MA | | 11.0 | |
| Methyl ethyl hydantoin formaldehyde | 7.0 | | |
| Dimethyl hydantoin formaldehyde | | 6.7 | 5.0 |
| Octyl-phenoxy polyethoxyethanol | | 16 | 19.65 |
| Antioxidant | 0.25 | 0.25 | 0.25 |
| Stearato chromic chloride | 0.05 | 0.05 | 0.1 |
| Total | 100.00 | 100.00 | 100.00 |

For each adhesive a mixture of methanol, isopropanol and toluol is used to adjust the solids content to 30%.

Tapes are prepared as set forth in Example 2 utilizing each of the above-adhesives. In each case the tape is repulpable.

It will be understood that it is intended to cover all changes and modifications of the examples of the invention herein chosen for the purpose of illustration which do not constitute departures from the spirit and scope of the invention.

What is claimed is:

1. A repulpable pressure-sensitive adhesive tape comprising a water-dispersible backing having applied to at least one surface thereof, a water-dispersible adhesive consisting essentially of from about 50 to about 90 parts of polyvinyl methyl ether, based on 100 parts by weight of the total adhesive; from about 0.1 to about 0.5 part of a $C_1$–$C_4$ alkyl half ester of a copolymer of vinyl methyl ether and maleic anhydride; and from about 0.05 to about 0.2 part of hydantoin formaldehyde resin, the amounts of the alkyl half ester and the resin being on the basis of one part of the polyvinyl methyl ester.

2. The repulpable tape of claim 1, wherein the half ester is the methyl half ester of polyvinyl methyl ether-maleic anhydride and the hydantoin formaldehyde resin is dimethyl hydantoin formaldehyde.

3. The repulpable tape of claim 2, wherein the adhesive is applied to both surfaces of the backing.

4. The repulpable tape of claim 1, wherein the water-dispersible adhesive includes a water-dispersible tackifier resin.

5. The repulpable tape of claim 1, wherein the adhesive is applied to both surfaces of the backing.

6. The repulpable tape of claim 3, wherein the proportions by weight, for each 100 parts by weight of adhesive, are from about 50 to about 80 parts polyvinyl methyl ether and no more than about 20 parts tackifier resin.

7. The repulpable tape of claim 6 wherein the tackifier resin is an alkyl-phenoxyethylene oxide condensation product.

8. The repulpable tape of claim 6, wherein the adhesive is applied to both surfaces of the backing.

References Cited

UNITED STATES PATENTS

| | | | |
|---|---|---|---|
| 2,838,421 | 6/1958 | Sohl | 117—68.5X |
| 2,979,477 | 4/1961 | Land | 260—851X |
| 3,152,940 | 10/1964 | Abel et al. | 117—1X |
| 3,262,838 | 7/1966 | Vieth et al. | 260—851X |
| 3,280,217 | 10/1966 | Lader et al. | 117—161X |
| 3,374,242 | 3/1968 | Kelley | 260—851X |

WILLIAM D. MARTIN, Primary Examiner

B. D. PIANALTO, Assistant Examiner

U.S. Cl. X.R.

117—76, 122, 161; 260—851